April 20, 1948.　　　J. S. BEATTIE　　　2,440,137
CAMERA-POD
Filed May 9, 1945
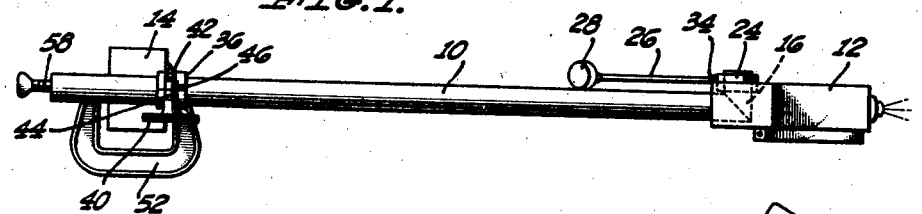
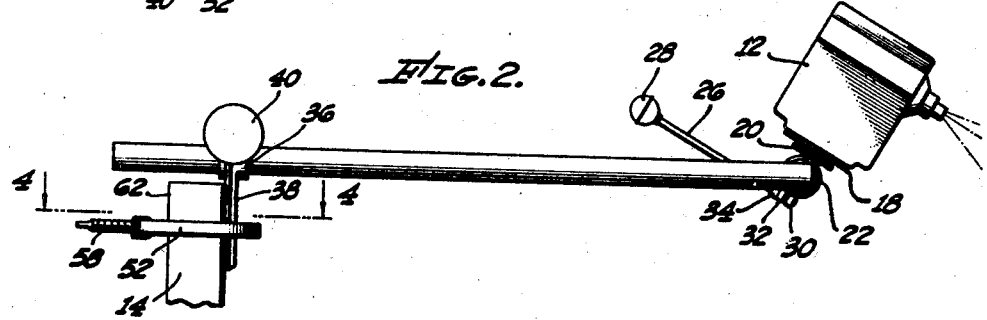
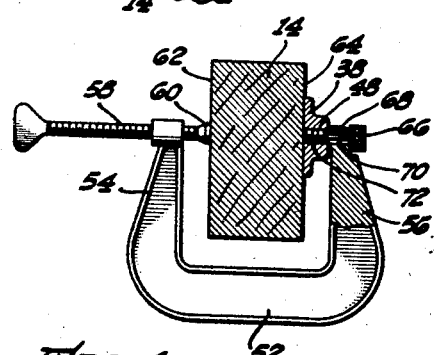
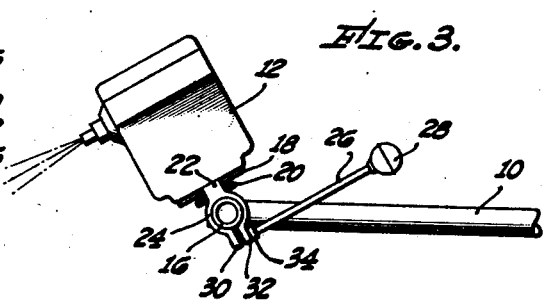
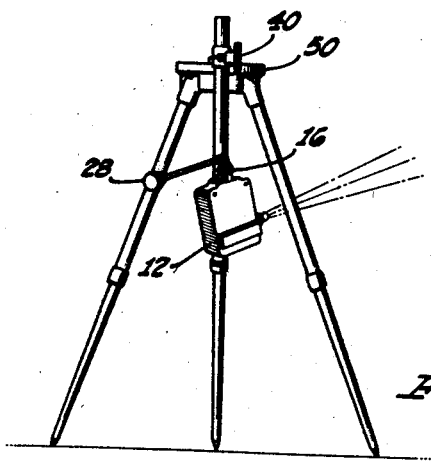
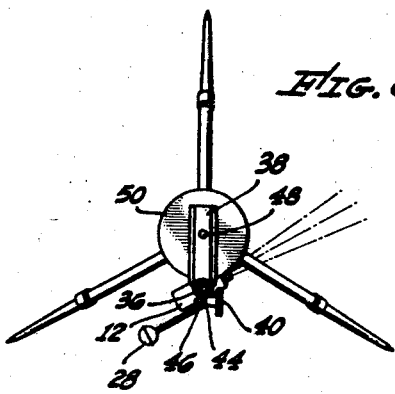
INVENTOR.
JAMES S. BEATTIE,
BY
ATTORNEY.

Patented Apr. 20, 1948

2,440,137

UNITED STATES PATENT OFFICE 2,440,137

CAMERA-POD

James S. Beattie, Los Angeles, Calif.

Application May 9, 1945, Serial No. 592,822

3 Claims. (Cl. 248—226)

This invention relates to an adjustable camera-pod or camera head which may be used to attach a camera to a large variety of naturally-occurring supports in a manner most advantageous to obtain photographic shots from a great many different angles.

The invention is particularly designed to provide a camera with both rigid and adjustable mounting particularly in instances in which a tripod or other support is too cumbersome or otherwise impractical. For example, in making time and motion studies with my device, a camera may be positioned at the most advantageous angle with a minimum of equipment which would tend to impede the work or distract the operator. Similarly, my device may be used in recording dental or surgical operations by using it to attach a camera directly to the operating chair or table, or again, it may be used in inaccessible parts of moving machinery in photographing parts with stroboscopic light. Likewise it can be used to photograph inaccessible moving parts of aircraft in test flights and in other instances which require a camera firmly supported in a restricted space.

Numerous other advantages and applications will be evident from the following description and drawings wherein:

Figure 1 is a plan view of a camera attached by my device to a vertical support;

Figure 2 is a side elevation of the device of Fig. 1;

Figure 3 is a view similar to Fig. 2 but taken from the opposite side;

Figure 4 is a sectional view along the line 4—4 of Fig. 2 showing the attachment of my device to the vertical support;

Figure 5 is a perspective of a camera attached beneath the head of a tripod by my device; and Figure 6 is a plan view of the apparatus of Fig. 5.

Essentially my camera head comprises an elongated rigid support 10 upon which a camera 12 is mounted so as to be rotatable at right angles to the support 10, which support is in turn attached to any handy object 14 in such manner that the support 10 is rotatable about its longitudinal axis. By the combination of these two possible movements, the camera may be focused on any point on the inner surface of a theoretical sphere of which it forms the center.

The particular combination of structural elements employed to obtain this result in the illustrated embodiment includes a cylindrical L-shaped member 10, the shorter arm 16 of which carries the camera 12 by means of a base plate 18 attached to the camera by a thumb screw 20, a right-angle extension 22 of the base plate being formed integral with a spring clamp 24 which journals the shorter arm 16 of the L-shaped support 10. Fixation of the camera 12 together with its base plate 18 at any position of rotation about the shorter arm 16 of the L-shaped support 10 is effected by tightening the spring clamp 24 by means of a rod 26, one end of which is enlarged to form a knob 28 adapted to be grasped by the hand of the operator, the other end of which is threaded to be received in tapped lip 30 after passing through drilled lip 32 of the spring clamp 24. A flange 34 on the rod 26, upon rotation of the rod acts to tighten the spring clamp 24 upon the cylindrical arm 16 by forcing the drilled lip 32 against the tapped lip 30.

The opposite end of the longer arm 10 of the L support is slidably mounted in a spring clamp 36 which is formed integral with a flat plate 38 disposed at right angles to the axis of the clamp. The clamp 36 is tightened on the shaft 10 by means of a serrated knob 40 on a threaded shaft 42, which upon rotation, acts to force drilled lip 44 against tapped lip 46 similar to the operation of spring clamp 24.

The plate 38 contains a centrally located, tapped aperture 48 by which it may be fastened to a drilled surface such as the tripod head 50 with a threaded bolt or in the alternative the plate 38 may be attached to a suitable clamp such as C-clamp 52 for clamping to the great variety of untapped surfaces which come to hand.

In the present embodiment, the C-clamp 52 has its two arms 54 and 56 tapped, arm 54 being adapted to receive threaded shaft 58, a flattened end 60 of which is disposed to tighten against one side 62 of a support 14 on which the camera head and camera are being mounted. The plate 38 which is an extension of spring clamp 36 is pressed against the opposite side 64 of the support 14 by a threaded shaft 66 which traverses in turn aperture 68 of arm 56 and then the drilled aperture 48 of plate 38. Of the two aligned apertures, 68 in the C-clamp and 48 in the clamp plate, it is preferred to have only one of them threaded so that the bolt 66 will not lock the arm 56 of the C-clamp against rotation along the axis described by the two bolts 58 and 66. In the alternative, as here illustrated, this may be effected by the bolt 66 having an upper restricted unthreaded portion 70, the lower threaded portion 72 being confined to the tapped aperture 48 of the clamp plate 38.

In operation, the camera head may be mounted, by means of the C-clamp 52 upon multitudinous supports such as tables, chairs, window ledges, fire escapes, limbs of trees, automobiles, hatracks, structural parts of machinery, or many other available surfaces, a suitable elevation of the camera quickly obtained by sliding the cylindrical support 10 to the desired position in the spring clamp 36 (in the event the attachment is to a horizontal surface) and adjusting the camera 12 to the desired angle by rotation about the cylindrical arm 16 of the L-shaped member. On the other hand, if attachment of the clamp 52 is made to a vertical support, angular adjustment of the camera 12 may be accomplished both by rotation of the cylindrical support 10 within the spring clamp 36 and by positioning the camera 12 about the shorter arm 16 of the L-shaped support.

Utilization of the present camera head is of special value in obtaining photographs of horizontal objects which cannot be tilted such as aquarium or laboratory specimens, or again, it may be moved along a horizontal support such as a bench or window sill to obtain successive shots of a series of objects all viewed from the same angle, etc.

In addition, after securement of the clamp 52 to a suitable support, the L-shaped member 10 together with its attached camera 12 may be completely removed from the spring clamp 36, reversed, and reinserted from the opposite side of the spring clamp. Thus, if the support 10 is mounted vertically, this procedure serves to double the range of elevation obtainable by sliding the support 10 within the clamp 36.

It should be understood that references to horizontal and vertical supports to which the present camera head is clamped are made principally by way of contrast, since the camera head may of course be clamped to a support which is neither horizontal nor vertical but which is disposed at any intermediate angle. Likewise the attached surface need not be flat, as here illustrated for convenience, but may be curved or otherwise configured.

Still another application for the present camera mount is found in conjunction with a conventional tripod. By the use of my camera head, the camera may be mounted beneath the tripod head, 50, as shown in Figs. 5 and 6, to obtain angle shots otherwise unobtainable with a tripod alone; and, in addition, the support 10 and attached camera 12 may be withdrawn from the clamp 36 as shown in Fig. 5, inverted and reinserted in the clamp 36 from above, thus raising the maximum camera level obtainable by the tripod alone. Furthermore, the camera mounted thus in either position above or below the tripod head may be vertically adjusted by simply sliding the cylindrical support 10 within the clamp 36 without resorting to adjustment of each of the three tripod legs to alter the elevation of the camera. Still other ways of using my adjustable camera head will be apparent to those skilled in the art.

I claim:

1. A camera support comprising a camera mount, a cylindrical L-shaped member, a spring clamp adapted to attach the camera mount to the shorter arm of the L-shaped member, a handle mounted on said clamp and operable to hold the camera mount at positions of rotation about said shorter arm, a substantially flat plate having an axially aligned aperture and adapted to register with a stationary object, a spring clamp positioned to secure said plate to the longer arm of the L-shaped member and a C-clamp rotatably attached to said plate at said aperture and adapted to secure said plate to said stationary object.

2. A camera support which includes: a cylindrical shaft; a stub shaft perpendicularly attached to said cylindrical shaft at one end thereof; a plate adapted to support a camera; a threaded rod passing through said plate adapted to secure said camera thereto; a spring clamp member attached to said plate and encircling said stub shaft, said clamp member tending to hold said plate loosely to said stub shaft; a threaded handle mounted in said clamp member, operable to tighten said clamp member to hold said plate rigidly to said shaft, or to loosen said clamp member so that said plate may be rotated about said shaft by said handle; a plate adapted to be attached to a supporting member; a spring clamp member attached to said last mentioned plate and encircling said cylindrical shaft, said last-mentioned clamp member tending to hold said last-mentioned plate loosely to said shaft for rotation about the axis of said shaft and for movement along the axis thereof; and a threaded rod mounted in said last mentioned clamp member, operable to tighten said clamp member to hold said plate rigidly to said shaft.

3. A camera support which includes: a cylindrical shaft; a stub shaft perpendicularly attached to said cylindrical shaft at one end thereof; a plate adapted to support a camera; a threaded rod passing through said plate adapted to secure said camera thereto, said plate and said camera thereby moving in unison; a pair of spring arms rigidly attached to said plate and loosely encircling said stub shaft to hold said plate thereto; a handle threadedly attached to said spring arms whereby rotation of said handle about its axis is effective to clamp or loosen said arms about said stub shaft, and rotation of said handle about the axis of said stub shaft is effective to rotate said plate and said camera therewith; a plate adapted to be attached to a supporting member; a pair of spring arms rigidly attached to said last-mentioned plate and loosely encircling said cylindrical shaft to hold said plate thereto; and a threaded rod mounted in said last-mentioned spring arms, operable to clamp or loosen said arms about said shaft.

JAMES S. BEATTIE.

REFERENCES CITED

The following references are of record in the file of this patent:

UNITED STATES PATENTS

| Number | Name | Date |
| --- | --- | --- |
| 704,666 | Stephens | July 15, 1902 |
| 1,211,347 | Plofchan et al. | Jan. 2, 1917 |
| 1,211,527 | Berndt | Jan. 2, 1917 |
| 1,296,060 | Ferguson | Mar. 4, 1919 |
| 1,412,961 | Periolat | Apr. 18, 1922 |
| 2,012,941 | Corron et al. | Sept. 3, 1935 |